May 1, 1956 T. L. BINSWANGER 2,743,999
COUNTERCURRENT LEACHING METHOD AND APPARATUS
Filed Sept. 21, 1951 2 Sheets-Sheet 2
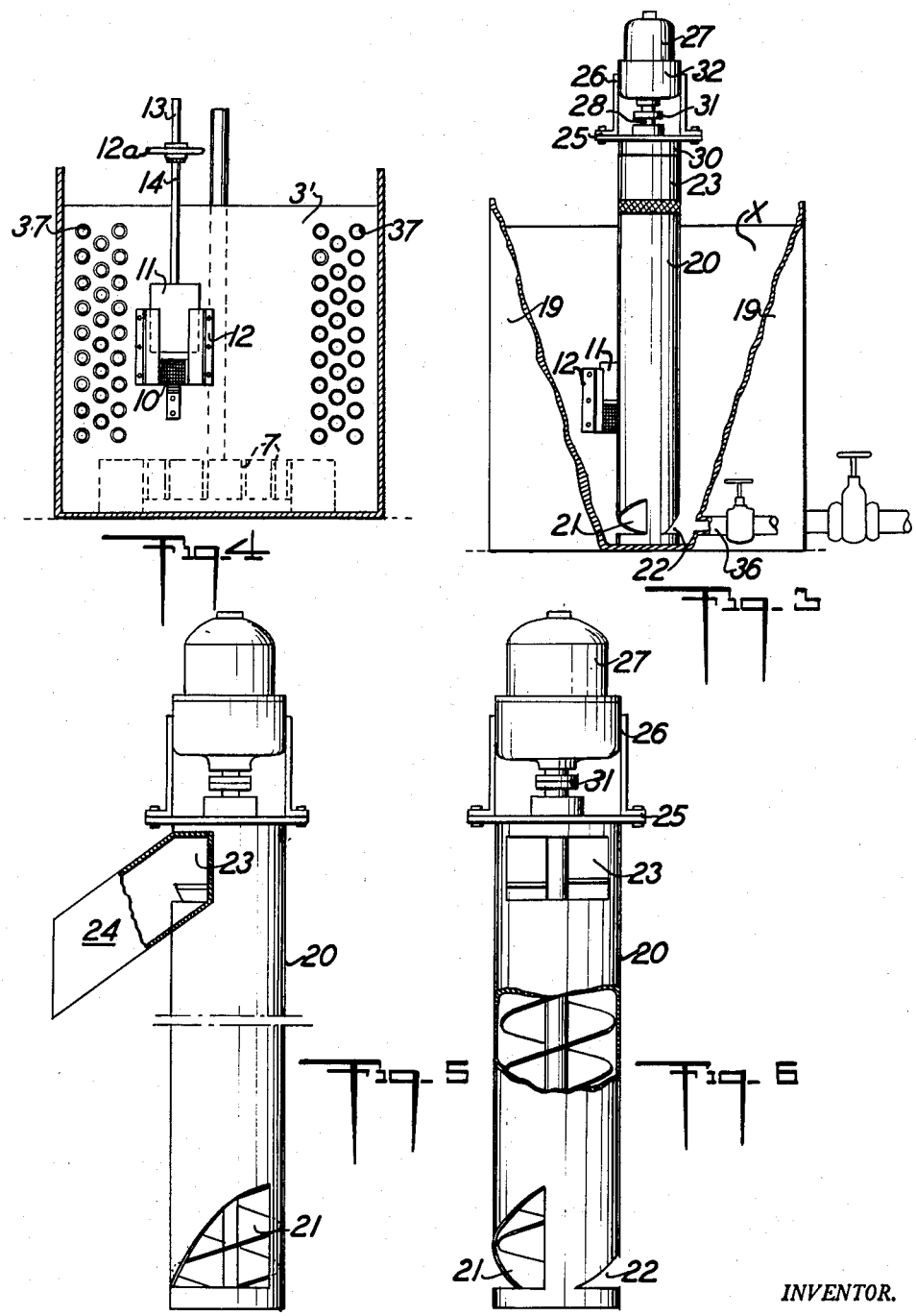
INVENTOR.
TOLSTOY L. BINSWANGER
BY
Bernard J. Garvey
ATTORNEY

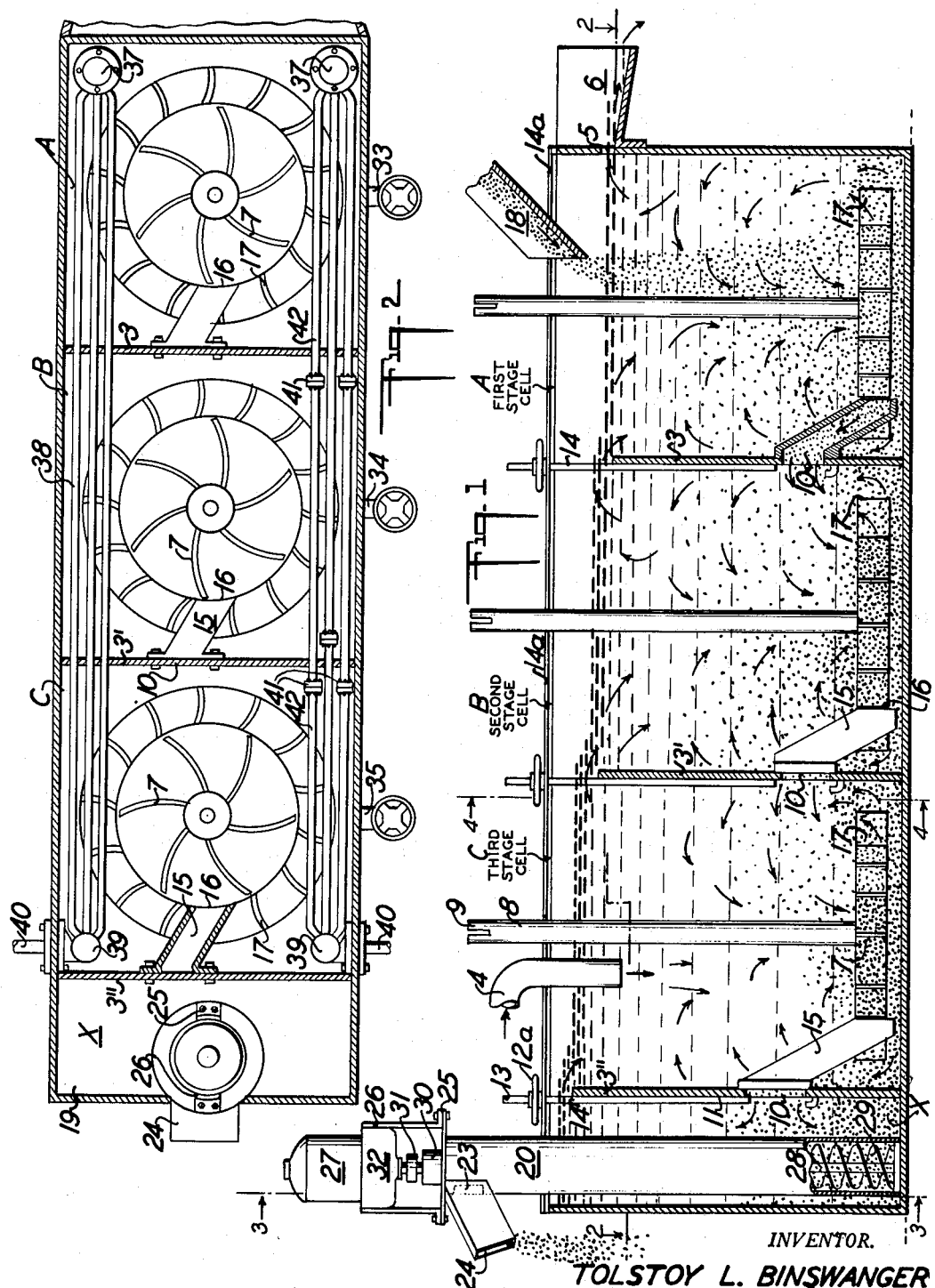

United States Patent Office 2,743,999
Patented May 1, 1956

2,743,999
COUNTERCURRENT LEACHING METHOD AND APPARATUS

Tolstoy L. Binswanger, Carlsbad, N. Mex.

Application September 21, 1951, Serial No. 247,695

14 Claims. (Cl. 23—310)

This invention relates to a countercurrent leaching method and apparatus, and it is particularly adapted to leaching of ores, concentrates, etc.

The invention provides among its objects a leaching method and apparatus highly economical with respect to power and sometimes, where necessary, heat input, adapted to handle by countercurrent leaching in a highly efficient manner substantial quantities of ore to be leached to obtain maximum extraction of values therefrom.

The apparatus hereof has the advantage of substantial flexibility in that a dewatering conveyor and vertically mounted agitators are provided which are readily removable from their operating position with respect to other units for highly efficient leaching.

The invention further provides for countercurrent heating of a plurality of leaching cells operated as an improved countercurrent leaching process and provides, further, as apparatus features, heating units constructed of demountable sections for easy replacement and preferably of elongated straight tubes readily rotated to distribute the wear by abrasion at highly exposed portions.

The apparatus and method is peculiarly adapted to operate upon ore fines or concentrates thereof by introducing the same in a substantially closed circuit for countercurrent leaching to cause the ore and leaching liquor to pass in opposite directions to each other to extract maximum soluble values therefrom. Heat is applied concurrent with the flow of the solids, when the nature of the ore warrants use of heat, with countercurrent application of heat to the leaching liquor, whereby the freshly added solids are heated to a maximum for quick release of extractable values and substantially concentrated leaching liquor is heated to a maximum in the final countercurrent concentration stage to become more fully saturated just prior to leaving the saturation system at the final stage.

The method and apparatus will be best understood by reference to the attached drawings wherein:

Fig. 1 shows a side elevation in section with a side wall of the leaching tank broken away to show mounting and construction of internal details.

Fig. 2 is a plan view of the same tank, again in section, taken on the line 2—2 of Fig. 1.

Fig. 3 is an end view in section through the concentrator tank showing the conveyor for removal of settled spent fines taken on the line 3—3 of Fig. 1.

Fig. 4 is an end view in section through a leaching cell of the tank taken on the line 4—4 of Fig. 1.

Fig. 5 is a detailed view of the conveyor unit; and

Fig. 6 is another view similar to that of Fig. 5 taken at a 90° angle thereto showing additional details.

The apparatus as shown comprises an elongated, preferably rectangular tank 1 shown with an open top, which may in special instances be enclosed if desired. The tank is divided into a plurality of cells A, B and C comprising ore leaching stages by a plurality of partitions 3, 3', 3", each of which are set one higher than the next, all being lower than the side and end walls to provide a series of weirs through which fresh leaching liquor introduced in the final cell C through a pipe 4 will flow over the end of the baffle first 3' into cell B after filling cell C and then, after filling and overflowing cell B, into cell A over partition 3 next lower in the series and finally out through the end wall of cell A having an opening 5 surrounded by a trough 6 to lead enriched and spent leaching liquor to a dissolved product recovery system (not shown) prior to recycling the reclaimed leaching liquor to duct 4 and thence back into the system. The opening 5 is located at a point lower than the partition 3 to allow continuous flow to the outlet. Mounted vertically in each cell A, B and C are agitators of the turbomixer type having agitator vanes 7 suspended close to the bottom of the cell in a horizontal manner from shafts 8 adapted to be driven as a conventional turbomixer from the notched ends 9 by drive means not shown but readily coupled and uncoupled therefrom for easy removal or replacement thereof in the system. Each of the partitions 3, 3' and 3" have an opening 10 which may be circular or rectangular, allowing communication between cells for passage of suspension of solids in leaching liquor from one cell to the next in series. Mounted above each opening 10 is a plate-like gate member 11 slidable in guide plates 12 fastened to the partitions 3, 3' and 3" to open and close the openings 10 by rotation of a hand wheel 12a upon the threaded end 13 of a shaft 14 supported for vertical movement of said shaft and closure of the gate thereby from the ends of the tank by any suitable cross bracket such as angle iron 14a. Surrounding said opening 10, which is located about one-third of the distance up from the bottom of each partitioning element, is a trough-like duct 15 which extends both vertically and obliquely downward to open at 16 directly tangential to the thrust of impeller vanes 7 to allow the solids thrust thereby to enter and pass substantially upwardly and in a normal direction in which the curved and streamline turboflow of fluid suspension from said impeller vanes would normally be thrust therefrom with a minimum of resistance to lead said suspension through said duct and into and through the opening 10 into the next cell of the series. It will be observed that the position of the opening 10 in each cell is substantially above the impeller therein so that the solids passing immediately into a cell move into the large volume of liquid therein for maximum distribution, dilution and dispersion by further agitation in the total fluid volume of said cell for maximum contact with fresher leach liquor for further extraction of values therefrom.

Tangentially surrounding the lower portion of each impeller 7 are a series of stator vanes 17 adapted to tangentially surround and receive fluid suspension tangentially thrust against these vanes by the agitator vanes and recycle the suspension upwardly in highly turbulent flow so that the greater portion of fluid suspension is continually agitated in typical turbo-agitator fashion within the cell with only that portion directly striking the trough opening 16 being withdrawn by fluid thrust of the impeller vanes into the next chamber by trough 15 through opening 10.

Mounted above the first stage cell A is any suitable inlet 18 for addition of ore in dry or wet finely divided form shown in Fig. 1 as a trough, but which may be a pipe or conveyor screw or belt conventionally used in the art for supplying or conveying solds.

Following the final leaching stage, which may be the third or any number of subsequent stages, is a final settling stage X, which comprises a stage separated from the rest of the tank by the last partition 3" which is higher than other partitions 3' and 3 but does not quite extend to the open top of the tank. The partition 3" is thereby adapted for recycling fluid mechanically thrust by the last leaching stage into a final solids separating stage, the separated supernatent fluid overflowing partition 3″ as a normal weir for recirculation thereof into the leaching system.

The final solids separating stage is designed to allow the suspended solids to settle as a concentrate and allow the same to be removed in a substantially dewatered form continuously. For this purpose, the final stage cell X comprises two obliquely mounted plates 19 slanting from the top inward toward the center from each side to form a wedge shaped chamber in which the suspended solids in the fluid will settle as a concentrate in the bottom. Centrally mounted in the chamber X is a vertical screw-type conveyor comprising a cylindrical housing 20 with opposed intake openings in opposite sides of the bottom 21 and 22 and an outlet opening 23 on one side of the top thereof about which is fitted a troughlike duct 24 to receive and discharge exhausted solids from the system. The top of the cylindrical housing 20 is closed by a plate 25 carrying vertical bracket arms 26 extending upwardly therefrom to support coaxial with the housing a driving motor 27. Depending from said driving motor for rotation thereby is a central conveyor shaft 28 about which is supported the helical screw conveyor 29 extending from the bottom to the top of said housing and terminating beneath the plate 25. The shaft 28, however, extends through a bearing member 30 supported by plate 25 and thence through a flexible coupling 31 directly attached to the driving element of the motor 27 or intermediate thereto through conventional speed reduction gearing 32 in the end thereof.

Suitable drains 33, 34, 35 and 36 may be mounted in the bottom of each of the stages for ultimate cleaning of the system from time to time, said drains consisting of any suitable duct controlled by a valve.

As thus described, the system is operative for general leaching of solids, but for certain types of processing involving ores wherein substantial variation of solubility with temperature of some of the components to be extracted is present such as salts, particularly potash salts, it is desirable that heat be applied. According to the present method and apparatus, this is best effected by mounting of steam pipes within the system for applying heat, preferably greatest in the first stage of extraction, to impart to the substantially saturated leach fluid greater solubility for solubles first entering the system wherein they are present in substantial quantity. Thus, it would be desirable to apply the greatest degree of heat in stage A, the first stage of extraction, wherein the leach liquor, having already traversed stages B and C, is substantially saturated, but is rendered capable by highest heat imparted at this point by introduction of live steam through pipes therein to substantially raise the ability of the leach liquor to dissolve more solubles, particularly in the presence of freshly added first stage solids.

To this end, the preferred construction as shown comprises steam pipes which may run the entire length of the sides of the elongated leach tank through the several stages as single lengths of steam pipe joining header elements, as in conventional steam tube and drum construction. Alternatively, in a modification shown only on one side of Fig. 2, such steam pipes may be constructed of shorter elements to allow replacement of short sections of pipe. The heating system accordingly comprises an input steam header 37 having a series of steam tubes 38 bent slightly at an angle therefrom to evenly distribute heat from steam carried thereby through the series of pipes, as shown in Figs. 2 and 4. The steam pipes terminate in a companion outlet header 39, the condensed water therein being withdrawn through a duct 40. As shown in a modification on the opposite side of Fig. 2, the tubes, instead of extending as integral pipe units between headers, may be shorter lengths attached through coupling members 41 allowing replacement of shorter sections of pipe or rotation of shorter sections of pipe 42 to expose another portion thereof to zones of high abrasion and thereby distribute the wear for greater economy in use. It will be understood that either modification of pipe extending between headers, or shorter sections of pipe, as desired for most economical operation, may be used.

In normal operation, leach liquor is passed into the tank through inlet 4, which may be recycled liquor, with or without further addition of make-up water, from a stage of precipitation of values from a saturated liquor and which may further have supplied thereto a small amount of liquor overflowing from the settling stage X over partition 3″ as a weir. The leach liquor passes from stage C through B and thence through A over the respective partitions 3′ and 3 acting as baffles and flowing in series over each as a weir and thence out through opening 5 in the end wall of stage A into the trough 6 wherein the saturated leach liquor is treated to remove the dissolved values, by cooling or otherwise precipitating the solute therefrom, and thence recycling with or without a suitable amount of make-up water to the duct 4 for continuous leaching. Fresh ore or concentrates to be leached, broken into suitably fine particles, is simultaneously added to first stage A through duct 18. In each of the three stages as shown, or any other suitable number mounted in series, the impellers 7, rotated by upwardly extending shafts 8, turbulently agitate the fluid therein to form a suspension of the ore fines in the leach liquor. The impeller 7, in rapid rotation to give highly turbulent flow, throws all of the fines generally tangentially against the stator vanes 17 which recycle the same upwardly in each cell to cause a circulation of the suspension for optimum leaching. The fines which are thrown tangentially directly into the trough 15 through opening 16 are forced mechanically upwardly through said trough and out through the opening 10 into the next stage in countercurrent flow to the passage of leach liquor, i. e. from stage A to stage B, thence to stage C, and finally into settling stage X. Upon arriving at stage X, the solid particles without agitation and in the conical bottom form a concentrate therein and are picked up through both openings 21 and 22 of the helical screw conveyor rotated by motor 27 and are substantially dewatered therein, ultimately being forced out of the housing 20 through opening 23 and into trough 24 for final discharge from the system as moist concentrated spent solid. The supernatant fluid above the settled solids, by continuous pressure of the turboagitator of cell C is recycled over the weir 3″ for return to the system as leach liquor.

Where heat is to be used, steam is passed into header 37 to heat the first stage A to a desirably high temperature by heat exchange through the elongated steam tubes 38. The second stage B wherein said tubes continue is heated to a substantially lesser degree, the steam at this stage having begun to condense and may already have partially condensed, depending on initial steam conditions and overall design size of the unit.

Stage C is, of course, heated to a still lower temperature by substantially condensed and relatively cooled steam and hot water within the tubes 38 passing therethrough. It will be understood that substantial variation in the temperature imparted to each stage is possible by variation of the total steam input and temperature thereof with respect to the rate of flow of leaching liquor through each stage and total quantity thereof. Thus, heat is possible to any degree in each stage by judicious variation of design and operational conditions.

As thus described, the input comprises only four movable elements, i. e. the three impellers of the turbomixers whose shafts and coupling elements extend outside of the system to avoid corrosion of moving parts and necessity of stuffing glands as in conventional construction. Similarly, with respect to the final discharge conveyor, the entire unit is merely a cell carrying a helical screw wherein all operating units in contact with liquid or solids of the system are readily made corrosion resistant, the bearings, couplings and driving motors being well protected outside of the system and out of contact with the corrosion imparting substances.

Finally, both the discharge conveyor and impeller elements are readily demountable and removed from the system.

Other elements of construction herein shown, for example, the heating unit, may be made substantially rugged and corrosion resistant, particularly the pipes of the elongated heating unit being readily removable for easy replacement.

With respect to the heating system, it may be noted that other types of heating units, for example, coiled pipes, may be used for heating the various stages, separately or in series, for operation of the process as herein described. However, the present construction as shown is preferred from the standpoint of rugged and simple construction, allowing ready rotation of pipe units and replacement of parts.

In operation, further, it is noted that the discharge gates above each of the openings 10 may be regulated to control the amount of discharge through ducts 15 by restricting each opening 10 in accordance with the rate of movement of solids desired from stage to stage. It is further noted that the duct 15 which picks up solids impelled by the turboagitator blades 7 directly into the opening 16 is diagonally mounted to receive directly the thrust of particles from each vane 7 of the impeller in a streamline diagonally upward direction for optimum flow. Moreover, it is noted that each duct 15 slopes downwardly between inlet opening 16 and outlet 10 at each end of said duct, which construction prevents any possibility of settling of large particles within the duct itself.

It is to be noted that the agitators herein described are turbomixers intended for rapid rotation and mechanical thrust of particles in fluid suspension from stage to stage as to produce maximum turbulence within each stage for optimum leaching. The operation is in sharp distinction to slow moving paddle wheels which would not provide adequate thrust for either function. Thus the system is designed to move solids in fluid suspension mechanically by positive thrust within a fluid medium wherein the solvent fluid itself moves countercurrent thereto.

The system also provides for applying maximum heat to a final leach stage wherein the solvent itself has been countercurrently gradually heated to a maximum temperature, the ore itself being immediately heated to high temperature for optimum first stage removal of values within a substantially saturated leach liquor simultaneously heated to obtain maximum final stage solvent power. Such system is particularly desirable for dissolving of ores containing potash salts, for example, potassium chloride, wherein high temperature becomes essential and corrosion of equipment is maximum, and for which the apparatus and method hereof is particularly adaptable.

Various modifications of the present method and apparatus described will occur to those skilled in the art, and it is intended that such modifications, i. e. use of corrosion resistant alloys, suitable driving elements for agitators, corrosion resistant as well as high pressure and temperature resistant steam heating units, suitable bracketing and enclosure of the entire system as desired may be used.

It is accordingly intended that the illustration given herein be regarded as exemplary and not limiting except as defined in the claims appended hereto.

I claim:

1. Process for countercurrent leaching of soluble crystallizable solid inorganic salts from solids containing said salts as leachable components and other non-leachable solid components to form a concentrated crystallizable solution and spent solids comprising continuously passing a leach liquor countercurrently to said solids maintained as a dilute suspension in said liquor in a plurality of leaching stages whereby the leach liquor in each stage increases progressively in concentration of solute from a last stage to a first stage wherein a saturated solution of crystallizable solids is formed continuously adding lean leach liquor to the last stage and withdrawing said concentrated leach liquor from the first stage, continuously adding the solids to be leached to the first stage and withdrawing spent solids from the last stage, turbulently agitating the solids suspension within the leach liquor in each stage to evenly resuspend and distribute the solids as a dilute suspension in the total solution in each stage while continuously passing a minor portion of the fluid flow produced in said agitation countercurrently into an adjacent stage with respect to said leach liquor flow from the first agitated stage into the next stage in a series, continuously separating a substantially saturated crystallizable solution of inorganic salt at one end of the system from the first stage and continuously separating a concentrate of the exhausted insoluble solid residue from an opposite end of said system adjacent to a last stage.

2. The method as defined in claim 1 wherein the exhausted solids suspended in fresh leach liquor is continuously concentrated by removal of liquid leach liquor suspending medium therefor and said removed leach liquor is continuously returned to the last stage for passage through the system.

3. The method of countercurrently extracting solid crystallizable soluble inorgnic salts from solids containing said salts and other insoluble solid components to form a concentrated crystallizable solution and spent solids, comprising countercurrently passing a leach liquor in several leaching stages from a last stage to a first stage of a leaching system, simultaneously passing fresh solids in the same number of stages from a first stage to a last stage of said system, continuously turbulently agitating said solids to form and maintain a dilute turbulently agitated suspension thereof in said leach liquor in each of the stages while diverting a small portion of the dilute solid suspension from each stage by the force of said agitation to mechanically thrust the same into an adjacent stage, countercurrent to the flow of said leach liquor, whereby a substantially concentrated leach liquor as progressively formed passes to the first stage and a substantially exhausted suspension of solids as continuously leached in said stages passes to a last stage in contact with freshly supplied leach liquor, continuously heating the leach liquor passing from stage to stage in increments of increasing temperature in each stage in a series from said last stage to first to progressively increase the solvent power of said leach liquor with increase of solute content whereby said concentrated leach liquor becomes heated to a maximum in contact with incoming solids in said first stage, continuously withdrawing concentrated hot leach liquor from said first stage and continuously withdrawing exhausted solids wet with substantialy fresh leach liquor from said last stage.

4. The method as defined in claim 3 wherein the leach liquor is an aqueous solvent and the solid extracted therewith is an ore containing potassium chloride.

5. Countercurrent leaching apparatus for crystalline solids comprising a tank separated into cells by partitions varying in height progressively from the highest at the last stage cell to the lowest at the first stage cell, each partition forming a weir for flow of fluid thereover by gravity stagewise from cell to cell from the last stage to the first, duct means communicating with the last stage cell for addition of leach liquor thereto and duct means communicating with the first stage cell for withdrawing a concentrated solution of leach liquor from the first stage cell, duct means for supplying solid fines to be leached to said first stage cell and means communicating with said last stage cell for withdrawing, and concentrating spent solids from said last stage cell, a turbomixer agitator mounted for horizontal rotation of impeller eements near the bottom of each cell, an opening in each partitioning element between cells disposed above each impeller element, a duct having one end surrounding and depending from each partition opening with its other end disposed tangentially to an impeller element to receive a portion of the fluid thrust radially from an impeller element and pass the same upwardly through the opening in said partition in the direction of the last stage cell.

6. Countercurrent leaching apparatus for crystallizable inorganic salts comprising a tank having partitioning elements dividing the same into a plurality of cells comprising leaching stages, each partitioning element extending from the bottom to a distance below the top of said tank varying in height in series from cell to cell whereby fluid placed in a last stage sufficient to overflow the partition thereof will flow in series from cell to cell, overflowing each partitioning element of lower height as a weir, a turbomixer horizontally rotating impeller mounted in each cell with the impeller thereof near the bottom, adapted to impart turbulent flow to the liquid suspension therein, an opening in an intermediate portion in each partition vertically above each impeller element, a duct surrounding each partition opening and dependent obliquely downward from each opening whereby the opposite opening of said duct is directly tangential and in the same plane of said horizontally mounted impeller element, duct means for introducing leach liquor in the cell comprising the last stage of said leaching apparatus and duct means for introducing solids to be leached in the cell comprising the first stage of said apparatus, means for continuously withdrawing enriched leach liquor from said first stage; a settling chamber mounted adjacent to said last stage cell to receive spent solids and leach liquor thrust out of said last stage cell, adapted to concentrate said solid suspension from said last stage, means for recycling supernatant liquid from said settling chamber into said last stage cell, and means for withdrawing and simultaneously dewatering the spent solids from said settling chamber.

7. Apparatus as defined in claim 6 wherein the last stage cell has the end wall thereof cut lower than the sides and adapted to act as a last weir, the impeller in said last stage being adapted to thrust the suspension of spent solid and liquid into said settling chamber and the supernatant liquid introduced into said settling chamber thereby overflowing the end wall of said last extraction stage cell as a weir for recycling thereof into the system.

8. Countercurrent leaching apparatus for crystallizable inorganic salts comprising a tank having partitioning elements dividing the same into a plurality of cells comprising leaching stages, each partitioning element extending from the bottom to a distance below the top of said tank varying in height in series from cell to cell whereby fluid placed in a last stage sufficient to overflow the partition thereof will flow in series from cell to cell, overflowing each partitioning element of lower height as a weir, a turbomixer horizontally rotating impeller mounted in each cell with the impeller thereof near the bottom, adapted to impart turbulent flow to the liquid suspension therein, an opening in an intermediate portion in each partition vertically above each impeller element, a duct surrounding each partition opening and dependent obliquely downward from each opening whereby the opposite opening of said duct is directly tangential and in the same plane of said horizontally mounted impeller element, duct means for introducing leach liquor in the cell comprising the last stage of said leaching apparatus and duct means for introducing solids to be leached in the cell comprising the first stage of said apparatus, means for continuously withdrawing enriched leach liquor from said first stage; a settling chamber mounted adacent to said last stage cell to receive spent solids and leach liquor thrust out of said last stage cell, adapted to concentrate said solid suspension from said last stage, means for recycling supernatant liquid from said settling chamber into said last stage cell, and means for withdrawing and simultaneously dewatering the spent solids from said settling chamber, said means for withdrawing and simultaneously dewatering spent solids comprises a helical screw conveyor mounted within a cylindrical housing having openings both at the top and bottom thereof whereby rotation of said conveyor lifts concentrated suspension in the bottom of said settling chamber and dewaters the same during rotary lift of said helical screw, the water passing downwardly within said cylindrical housing back into said settling chamber, the dewatered solids being lifted through the opening in the top thereof for withdrawal from the settling tank.

9. Apparatus for countercurrent leaching for crystallizable inorganic salts comprising a tank divided into a series of cells by partitioning elements, means for introducing leach liquor into a last cell comprising a last extraction stage, and means for flowing the same through several stages from said last stage cell to a first stage cell at the opposite end of said tank, means for introducing solids to be leached into said first stage cell, and means in each cell for turbulently agitating to form a dilute suspension of solids in said leach liquor and mechanically expelling a portion of said dilute suspension of solids from each cell in series from cell to cell countercurrently into said leach liquor, and means for heating said cells in series from said first stage cell to said last stage cell in increments of increasing temperature from cell to cell to provide the highest temperature in the first stage cell of the series whereby said cells are differentially heated from first stage to last, means for withdrawing enriched leach liquor from said first stage cell, and means for withdrawing a suspension of exhausted solids in dilute leach liquor from said last stage cell and means for recycling the leach liquor separated from exhausted solids to said last stage cell.

10. Countercurrent leaching apparatus for crystallizable inorganic salts comprising a tank divided into cells comprising leaching stages by a plurality of partitions extending across said tank and terminating a short distance below the top at different heights in a series to form adjacent cells, the highest near the last stage and the lowest near the first stage, whereby leaching liquor will flow from cell to cell over the top of each partition as a weir from the last stage to the first, a turbo-impeller mounted in each cell with a horizontal impeller element near to and parallel to the bottom thereof adapted to impart turbulent agitation of solids suspended in leach liquor, an opening in each partition substantially elevated above said impeller element, a duct surrounding each opening and extending diagonally downward therefrom, the opposite opening thereof lying adjacent to the periphery of each impeller to receive a portion of the tangential flow of suspended solids and fluid thrust therefrom for transmission therethrough to the next cell in series from first stage to last for countercurrent turbulent movement of solids suspended in liquid, means for introducing leach liquor in the last stage, and means for withdrawing a suspension of solids in leach liquor therefrom, means for introducing solids into said first stage, and means for withdrawing enriched leach liquor therefrom, a steam header mounted vertically in said first stage and means for introducing live steam therein, and a steam header mounted vertically in said last stage for receiving spent steam and water condensed therefrom, and means for withdrawing condensed water from said last mentioned steam header, a series of steam ducts interconnecting said header elements passing through said partitioning elements from said first stage to last whereby steam introduced into the header of said first stage transfers heat to the several stages in series in a temperature differential from first stage to last.

11. Apparatus as defined in claim 10 wherein the tubular steam conduits each comprise units assembled by bolting as to be readily removable.

12. Apparatus as defined in claim 10 wherein the tubular steam conduits comprise readily removable short sections of pipe.

13. Apparatus as defined in claim 10 having a settling chamber mounted adjacent to said last stage, said settling chamber having inwardly sloping walls to define a narrow concentrated solids zone at the bottom and a wide supernatant liquor zone at the top, means for passing said supernatant liquor back into the last leaching stage of the apparatus and means for withdrawing settled solids from the bottom of said settling chamber and removing substantially all of the suspending liquor therefrom.

14. Countercurrent leaching apparatus for crystallizable inorganic salts comprising a tank having partitioning elements dividing the same into a plurality of cells comprising leaching stages, each partitioning element extending from the bottom to a distance below the top of said tank, varying in height in series from cell to cell, a turbomixer horizontally rotating impeller agitator mounted in each cell with the impeller thereof near the bottom, an opening in an intermediate portion in each partition vertically above disposed each impeller element, a gate mounted to restrict the size of said opening by vertical movement on one side of said partitioning element, a duct mounted on the opposite side of each of said partitioning elements surrounding the opening therein and dependent obliquely downward from each opening whereby the opposite open end of said duct is directly tangential and in the same plane of said horizontally mounted impeller element, duct means for introducing leach liquor in the cell comprising the last stage of said leaching apparatus, duct means for adding solids to be leached to the cell comprising the first stage whereby turbulent agitation of each impeller element continuously forms a turbulently agitated suspension of solids in leach liquor and continuously thrusts a small portion of said suspension tangentially through each duct from cell to cell for countercurrent extraction of solids in leached liquor, and means for withdrawing concentrated leach liquor from said first stage cell and means for withdrawing a suspension of exhausted solids from said final stage cell.

References Cited in the file of this patent
UNITED STATES PATENTS

| Number | Name | Date |
|---|---|---|
| 708,494 | Randall | Sept. 2, 1902 |
| 1,363,970 | Grondal | Dec. 28, 1920 |
| 1,469,507 | Glaeser | Oct. 2, 1923 |
| 1,628,787 | Kennedy | May 17, 1927 |
| 2,176,899 | Gorden et al. | Oct. 24, 1939 |
| 2,227,605 | Swallen et al. | Jan. 7, 1941 |
| 2,282,265 | Swallen et al. | May 5, 1942 |
| 2,393,976 | Daman et al. | Feb. 5, 1946 |
| 2,405,105 | Kennedy | July 30, 1946 |
| 2,405,158 | Mensing | Aug. 6, 1946 |
| 2,423,456 | Logue | July 8, 1947 |
| 2,494,602 | Wright | Jan. 17, 1950 |
| 2,585,473 | Kennedy | Feb. 12, 1952 |